Inventors
KARL SPIESS
ALBERT FIETZEK
BY
Hammond and Littell
ATTORNEYS

March 24, 1970 K. SPIESS ET AL 3,502,201
VIBRATORY CONVEYOR

Filed Jan. 12, 1968 2 Sheets-Sheet 2

INVENTORS
KARL SPIESS
ALBERT FIETZEK
BY
ATTORNEYS

United States Patent Office 3,502,201
Patented Mar. 24, 1970

3,502,201
VIBRATORY CONVEYOR
Karl Spiess and Albert Fietzek, Herzogenaurach, Germany, assignors to Industriewerk Schaeffler OHG, Herzogenaurach, Germany, a corporation of Germany
Filed Jan. 12, 1968, Ser. No. 697,369
Claims priority, application Germany, Jan. 17, 1967,
J 32,788
Int. Cl. B65g 27/02
U.S. Cl. 198—220                3 Claims

ABSTRACT OF THE DISCLOSURE

A vibratory conveying apparatus comprised of a stationary base plate, a bowl provided with a helical track and capable of executing periodic rotary and vertical vibrations, said bowl being attached to the base plate by elastic guide springs.

STATE OF THE ART

Figure 1:
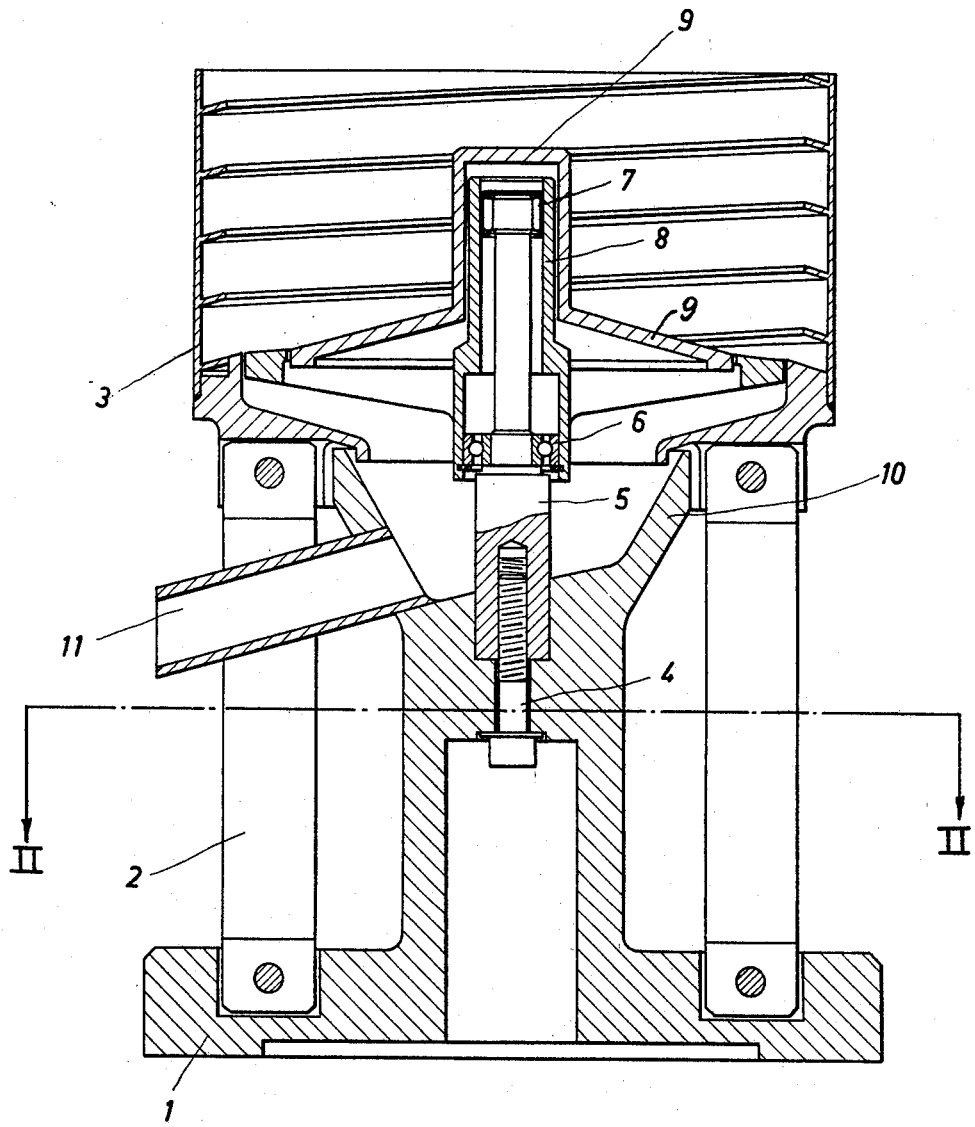

Vibratory conveying apparatus is used for the feeding and orienting of bulk parts. The bowl containing the parts to be transported is given rotational and vertical vibrations by electromagnetic drive means or by eccentric drive means. This induces the parts given in the bowl to travel upwardly in sequence on the helical track of the bowl. To obtain maximum conveying capacity with a minimum of driving forces the frequency of the driving forces has to be in resonance with the natural frequency of the vibrating masses.

In known vibratory conveying apparatus, the entire bowl containing the parts to be transported is vibrated and thus not only the bowl itself, but also the supply reservoir of parts at the bottom of the bowl are subjected to the vibratory forces. Since this supply reservoir of parts is continuously changing during the operation of the vibratory conveyor, the natural frequency of the vibrating bowl with the supply reservoir of parts is also changing and cannot be determined exactly. However, if the natural frequency of the vibrating bowl, depending essentially on the properties of the elastic guide springs and the local distribution of the vibrating masses, is not known, a resonance operation with the frequency of the driving means is not possible and so maximum conveying capacity will not be obtained. To make a resonance operation possible, the frequency of the driving means would have to be sufficiently variable to automatically adjust itself to the varying resonance of the bowl. However, this would require bulky and expensive electronic measuring and regulating equipment.

OBJECTS OF THE INVENTION

It is an object of the invention to provide a novel vibratory conveying apparatus in which the frequency of the vibrating bowl is in resonance with the frequency of the driving means.

It is another object of the invention to provide a novel vibratory conveying apparatus wherein the frequency of the vibrating bowl is independent from the supply reservoir of parts to be transported therein.

These and other objects and advantages of the invention will become obvious from the following detailed description.

THE INVENTION

The vibratory conveying apparatus of the invention is comprised of a stationary base plate, a bowl provided with a helical conveyor track, drive means for imparting rotational and vertical vibrations to the bowl, the said bowl being comprised of a base attached to the stationary base plate and a separate side wall supporting the helical track secured to elastic guide springs which, in turn, are secured to the stationary base plate. In a preferred embodiment of the invention, the base of the bowl is mounted rotatably and removably on the stationary base plate.

The advantages of the apparatus of the invention reside particularly in that an accurate determination of the resonance frequency of the vibrating mass is made possible. Only the wall and the helical track attached thereto as well as the parts present thereon will participate in the vibration. The bulk of the parts present in the bowl as a supply reservoir is in the base, which is secured to the stationary base plate and, consequently, does not participate in the vibration. The movement of the parts from the base onto the helical track is facilitated by the base being rotatably arranged on the stationary base plate. When none of the parts remaining in the bowl are to be transported, the upwardly removable bottom in conjunction with a corresponding design of the base plate permits an especially simple emptying of the bowl.

Figure 2:
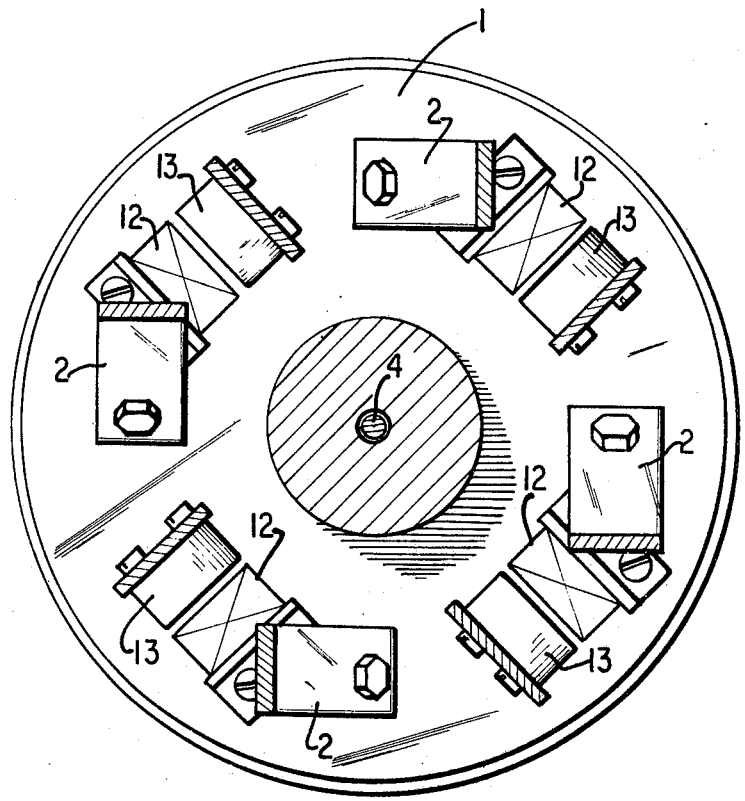

Referring now to the drawing:
FIGURE 1 is a sectional view of one embodiment of the vibratory conveying apparatus of the invention.
FIG. 2 is a section of FIG. 1 taken along line II—II.

In the illustrated embodiment, the apparatus is comprised of a stationary base plate 1 to which the wall 3 of the bowl supporting the helical conveyor track is connected by elastic guide springs 2. The drive means which is known is illustrated in FIG. 2. A shaft 5 is mounted by screw 4 onto the stationary base plate 1 and sleeve 8 is rotatably connected with shaft 5 by bearings 6 and 7. Base plate 9 is mounted on sleeve 8. The upper section 10 of the stationary base plate is funnel shaped so that when base plate 9 is raised, the remaining parts not transported fall into the funnel and are delivered by slide 11 to a receiving vessel. The drive mechanism may consist of electromagnet 12 and armatures 13 with the electromagnets being secured to base plate 1 and the armatures 13 being secured to wall 3.

Various modifications of the apparatus of hte invention may be made without departing from the spirit or scope thereof.

We claim:
1. A vibratory conveying apparatus comprising a stationary base plate, a bowl having a bottom portion and an unattached separate side wall provided with a helical conveyor track and drive means for imparting rotary and vertical vibration to only the separate sidewall, said bottom portion of the bowl being attached to the stationary base plate and said side wall being supported by elastic guide springs attached to the stationary base plate whereby the bottom portion of the bowl and any contents therein do not participate in the vibrations.
2. The apparatus of claim 1 wherein the bottom of the bowl is rotatably mounted on the stationary base plate.
3. The apparatus of claim 1 wherein the bottom of the bowl can be upwardly removed from the stationary base plate.

References Cited

UNITED STATES PATENTS
3,209,900  10/1965  Prutton.
2,832,464   4/1958  Smith.

EVON C. BLUNK, Primary Examiner
ROGER S. GAITHER, Assistant Examiner